(12) United States Patent
Chapman-Winter et al.

(10) Patent No.: US 11,754,244 B2
(45) Date of Patent: Sep. 12, 2023

(54) VEHICLE DESIGN ELEMENT INCLUDING A LIGHT ASSEMBLY

(71) Applicant: Motherson Innovations Company Limited, London (GB)

(72) Inventors: Matthew Chapman-Winter, Lonsdale (AU); Gary Dekievit, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/077,311

(22) Filed: Dec. 8, 2022

(65) Prior Publication Data

US 2023/0204173 A1    Jun. 29, 2023

(30) Foreign Application Priority Data

Dec. 23, 2021  (DE) .......................... 102021134620.7

(51) Int. Cl.
| | |
|---|---|
| *B60R 13/00* | (2006.01) |
| *F21S 41/24* | (2018.01) |
| *G09F 13/22* | (2006.01) |
| *F21S 41/141* | (2018.01) |
| *F21S 41/32* | (2018.01) |
| *F21Y 115/10* | (2016.01) |

(52) U.S. Cl.
CPC ............ *F21S 41/24* (2018.01); *B60R 13/005* (2013.01); *F21S 41/141* (2018.01); *F21S 41/32* (2018.01); *G09F 13/22* (2013.01); *F21Y 2115/10* (2016.08); *G09F 2013/222* (2013.01)

(58) Field of Classification Search
CPC .......... F21S 41/24; F21S 41/141; F21S 41/32; B60R 13/005; G09F 13/22
See application file for complete search history.

(56) References Cited

U.S. PATENT DOCUMENTS

| | | | |
|---|---|---|---|
| 7,866,858 B2 | 1/2011 | Hirzmann | |
| 2017/0059106 A1* | 3/2017 | Sato | .................... F21S 41/147 |
| 2018/0335195 A1* | 11/2018 | Martoch | ............... F21S 43/241 |
| 2020/0153093 A1* | 5/2020 | Goetzelmann | ....... H01Q 1/3283 |
| 2021/0122302 A1* | 4/2021 | McClelland | ............ B60Q 1/56 |
| 2022/0227031 A1* | 7/2022 | Onishi | ............. B29C 45/14377 |
| 2022/0234327 A1* | 7/2022 | Onishi | ............. B29C 45/14688 |
| 2022/0333755 A1* | 10/2022 | Sattler | ................... C23C 14/185 |

FOREIGN PATENT DOCUMENTS

| | | |
|---|---|---|
| DE | 102016119326 A1 | 4/2018 |
| JP | 2006044330 | 2/2016 |

OTHER PUBLICATIONS

German Patent and Trademark Office, Office Action for 10 2021 134 620.7, dated Oct. 6, 2022.

* cited by examiner

*Primary Examiner* — Christopher E Dunay
(74) *Attorney, Agent, or Firm* — Jones Day

(57) ABSTRACT

The present invention generally relates to vehicle emblems, badges, logos or design elements and in particular to a vehicle design element including a light assembly that can provide a uniform light output without the light source being viewable.

11 Claims, 9 Drawing Sheets

VEHICLE DESIGN ELEMENT INCLUDING A LIGHT ASSEMBLY

CROSS-REFERENCE TO RELATED APPLICATIONS

This application claims the benefit of priority to German Application No. DE 10 2021 134 620.7, filed on Dec. 23, 2021, which is incorporated by reference herein in its entirety.

BACKGROUND

1. Field

The present disclosure generally relates to vehicle emblems, badges, logos or design elements and in particular to a vehicle design element including a light assembly that can provide a uniform light output without the light source being viewable.

2. Related Art

An aesthetic feature which has become desirable in automotive applications is to provide exterior badges and emblems on vehicles which feature backlighting of key features of the particular badge or emblem. It is desirable that these key features be backlit with an even (uniform or homogenous) luminance using light emitting diodes (LEDs) input. An LED is a directional light source having a relative luminous intensity that decreases as the viewing angle is increased. This may result in the appearance of bright or hot spots to an external viewer of the badge.

Lighting systems that provide a uniform luminous intensity are known, for example systems using expensive organic light emitting diode (OLED) technology or complex lens and reflector arrangements. Highly diffusing materials are also used but these have the drawback of giving a milky or hazy appearance and have poor optical efficiency. A further desirable feature is that the LED input is not directly visible to the external viewer of the badge.

Furthermore, and with a particular reference to the use of these features on electric vehicles, there is an increasing requirement for energy efficiency, where vehicle electrical systems are required to draw as little from the battery as possible in order to improve the overall performance and efficiency of the vehicle.

It is against this background that the present disclosure has been developed. Thus, it is broadly the object of the present invention to provide a vehicle design element that is backlit and provides uniform luminous intensity while increasing energy efficiency.

SUMMARY

The object is solved by a first aspect of the present disclosure which provides a vehicle design element including a light assembly, the assembly including a light guide including a front surface, a rear surface, a plurality of light entry regions and a light diffusing region, a plurality of light emitting diodes (LEDs), each LED positioned adjacent to and directed towards a respective light entry region, wherein light from each LED enters the light guide via its respective light entry region, where is directed toward the light diffusing region of the light guide via internal reflection, a reflector element positioned behind the light guide adjacent to the rear surface of the light guide, the reflector element including a plurality of apertures corresponding to each LED and light entry region, the reflector element further including a front surface configured to reflect light toward the light guide, wherein the reflector element and light guide further comprise complimentary ribs and channels for controlling light distribution near the light entry regions, where the ribs are formed around the apertures in the reflector element, extending out from the front surface of the reflector, where they are configured to nest in complimentary channels formed in the rear surface of the light guide so as to interrupt the passage of light rays that have entered the light guide via the light entry regions.

In one embodiment, each light entry region includes a light entry surface formed in the rear surface of the light guide, through which light emitted by its corresponding LED may penetrate the light guide, where it is then transmitted by internal reflection.

In one embodiment, each light entry region further includes a conical surface formed in the front surface of the light guide, wherein the light entry surface is shaped to deflect/refract the majority of light rays toward the conical surface, wherein the conical surface is configured to reflect the light rays toward the rear surface of the light guide, where they will continue to be reflected by internal reflection along the light guide between the front and rear surfaces.

In one embodiment, each light entry region further includes a step down surface contiguous with the conical surface and the front surface of the light guide, at a position where, by virtue of the configuration of the light entry surface and the conical surface, a negligible amount of light rays are directed, the step down surface allowing the thickness of the remainder of the light guide away from each light entry region to be reduced.

In one embodiment, the complimentary ribs and channels extend around a portion of each light entry region.

In one embodiment, the vehicle design element further comprises a lens assembly (500) positioned in front light guide, the lens assembly (500) comprising a light transmissive region and an opaque region, the light transmissive region provided adjacent to the diffusing region of the light guide, such that light exiting the front surface of the light guide opposite the diffusing region is transmitted through the lens assembly (500).

In one embodiment, the vehicle design element further comprises a rear housing and a front housing, that work in conjunction with the lens assembly to house the LEDs, reflector and light guide together in a weatherproof environment.

In one embodiment, the lens further comprises a continuous transparent and/or translucent coating on an outer surface facing the external environment.

In one embodiment, the continuous transparent and/or translucent coating comprises a transparent and/or translucent thin metal layer formed from a metal, alloy, or metalloid selected from the group consisting of chromium, aluminium, titanium, nickel, molybdenum, zirconium, tungsten, silicon, niobium, tantalum, vanadium, cobalt, manganese, silver, zinc, indium, germanium, tin, boron, arsenic, antimony, tellurium and mixtures thereof; and/or an oxide, nitride, boride, fluoride or carbide thereof, and mixtures thereof.

In one embodiment, the transparent and/or translucent coating is a chromium or chromium-based reflective coating, and both the lens, the chromium or chromium-based reflective coating are at least partially transmissive to light originating from the light guide.

In one embodiment, a paint and/or opaque material is coated onto the lens to form a mask layer.

BRIEF DESCRIPTION OF THE DRAWINGS

Embodiments of the present disclosure will be discussed with reference to the accompanying drawings wherein.

DETAILED DESCRIPTION

Referring now to FIGS. 1 to 7, there is shown a vehicle design element including a light assembly 1, according to an embodiment. However, it is noted that the following is not limited to one specific embodiment but that these features generally define the invention and that these features are not inseparably linked and can be generalized as described.

Figure 1:
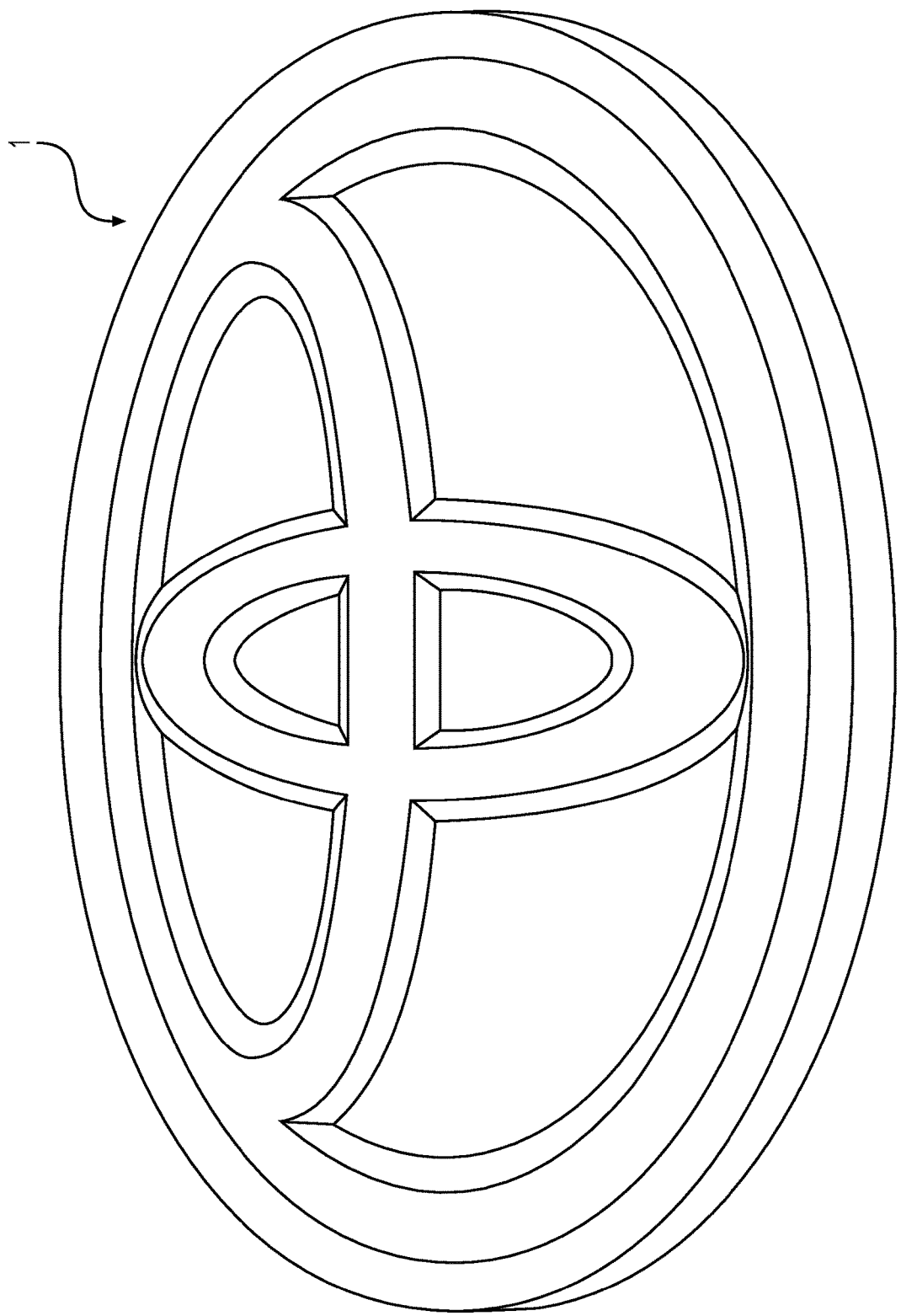
FIG. 1 is a front perspective view of a vehicle design element, according to an embodiment.
Figure 2:
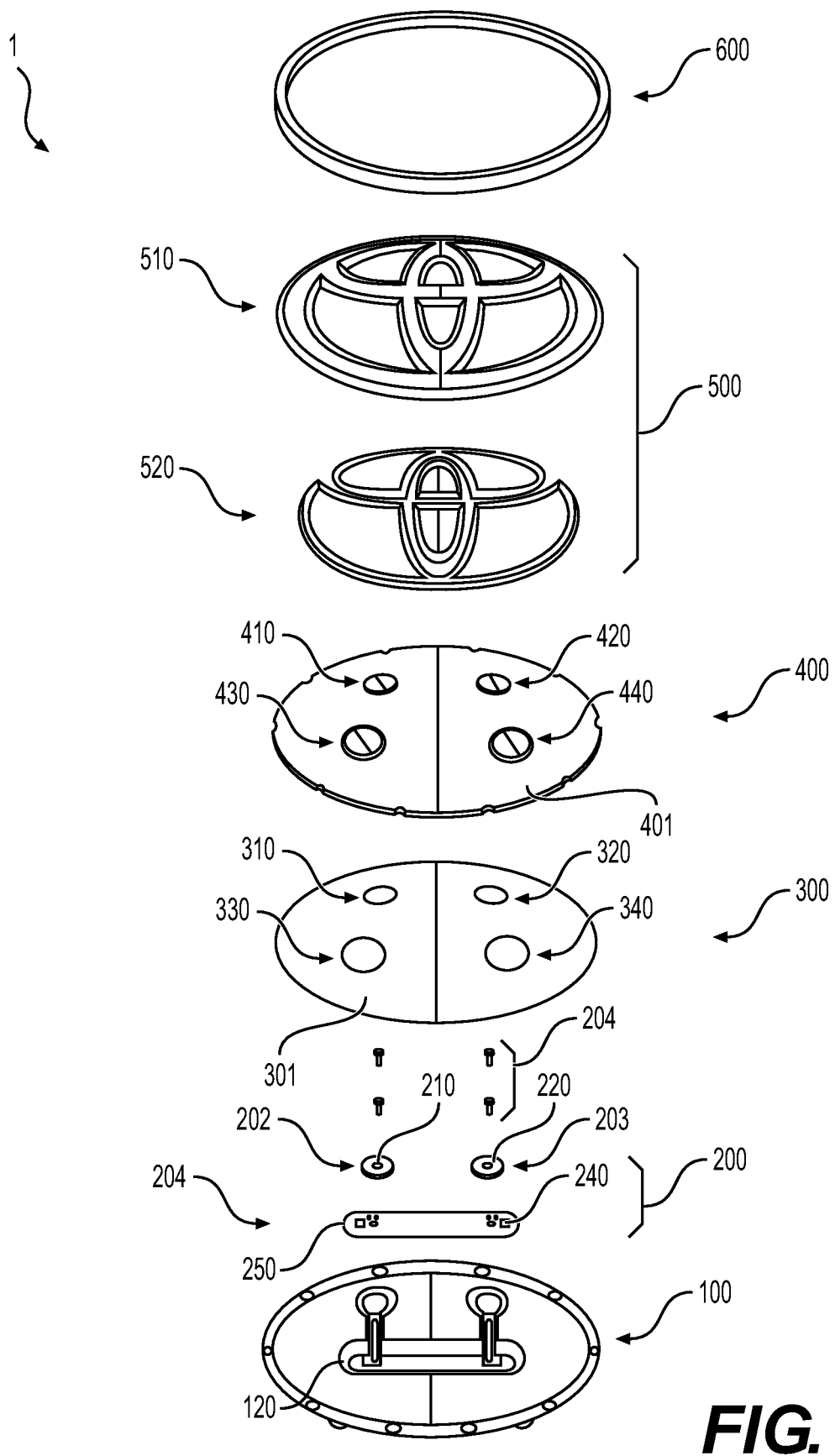
FIG. 2 is a front exploded view of the vehicle design element of FIG. 1.
Figure 3:
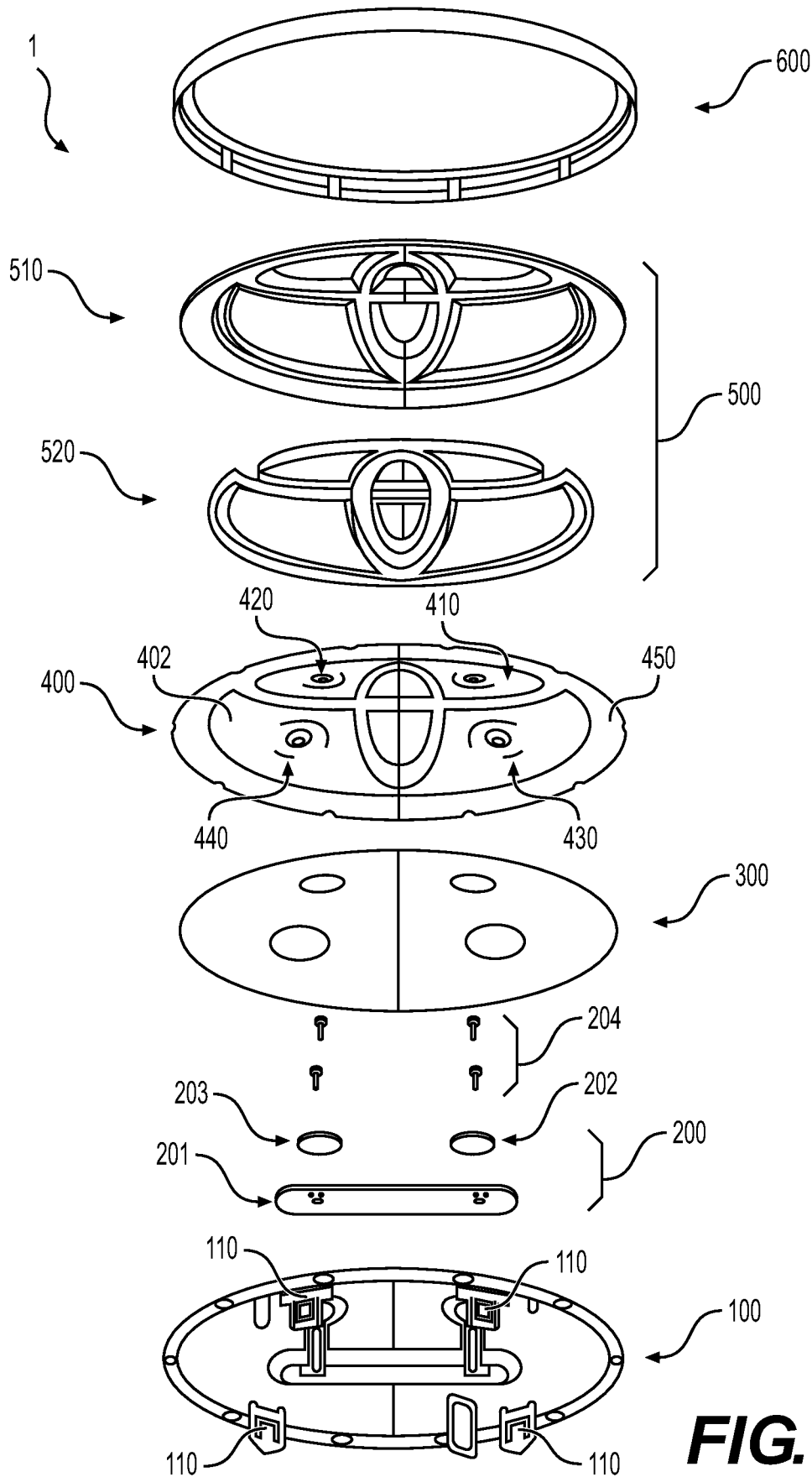
FIG. 3 is a rear exploded view of the vehicle design element of FIG. 1.

As best shown in FIGS. 2 and 3, the assembly 1 comprises a number of separate components. Starting from the rear and working toward the front, there is the rear housing 100, printed circuit board assembly (PCBA) 200, reflector 300, light guide 400, lens assembly 500 and front housing 600.

It can be seen that in this embodiment, the vehicle design element is in the form of an automotive badge comprising a logo for a well-known automotive brand, having a curved (or convex) oval shape, which is imparted on the rear housing 100, reflector 300, light guide 400, lens assembly 500 and front housing 600. It will be appreciated that other or alternative brands and/or designs are also intended to fall within the scope of this disclosure. For instance, in an alternate embodiment, the vehicle design element may instead be substantially planar (or flat), such that the rear housing, reflector, light guide, lens assembly and front housing will also take this planar (or flat) form. Any other form, such as concave, waved, uneven forms, or the like.

The rear housing 100 comprises fastening means 110 for securing the assembly to a vehicle. The rear housing 100 works in conjunction with the lens assembly 500 and front housing 600 to house the PCBA 200, reflector 300 and light guide 400 together in a weatherproof environment, where the rear housing 100 and front housing 600 are configured to be secured together, effectively sandwiching the remaining components together. Both the front and rear housings 100, 600 are opaque, and preferably black, to prevent or at least substantially reduce any unwanted light bleed from the assembly 1. In a preferred form, the rear housing 100 is manufactured from a black nylon and the front housing 600 is manufactured from PMMA. Other suitable materials may be generally employed and these materials are not limited to the embodiment described here.

The rear housing 100 features recessed portions 120 for accommodating the PCBA 200. In the embodiment shown, the PCBA 200 comprises three printed circuit boards 201, 202, 203 configured to be secured to the rear housing 100 via fasteners 204, and providing a total of four LEDs 210, 220, 230, 240 positioned apart from one another and oriented in a generally forward direction. It will be appreciated that the configuration of the printed circuit boards 201, 202, 203 and the position and number of LEDs can be varied, depending on the light output required, and the specific logo size and styling. It will also be appreciated that each LED emits a light beam comprising a plurality of light rays arranged about a main optical axis, preferentially in an axisymmetric manner.

Positioned in front of the rear housing 100 and PCBA 200 is the reflector 300, which features four apertures 310, 320, 330, 340 positioned and sized such that light emitted from each of the LEDs 210, 220, 230, 240 passes through the apertures and toward the light guide 400. Further information about the reflector 300 will be provided later in this disclosure.

The light guide 400 is positioned in front of the reflector 300 and features four light entry regions 410, 420, 430, 440 positioned adjacent to the apertures 310, 320, 330, 340 in the reflector and the LEDs 210, 220, 230, 240. The four light receiving regions each feature geometry configured to maximise the amount of light internally reflected in to the light guide 400 from a respective adjacent LED. Aside from the light receiving regions, the remainder of the light guide 400 has a substantially constant thickness. As previously discussed, other physical features such as the convex oval shape are dictated by the shape of the badge, and it will be appreciated that alternative shapes as described above are also intended to fall within the scope of this disclosure. For example, the light guide may take on a variety of geometric shapes, such as a circle, a triangle or quadrilateral in curved or planar form, but is not limited thereto. In a preferred form, the light guide 400 is manufactured from a clear PMMA having light scattering properties, such as ACRYLITE® LD12. It will of course be appreciated that in an alternative embodiment, other suitable materials may be employed.

The light guide 400 features a diffusing region 450, which may be formed from printed dot patterns or an etch finish formed on the rear surface 402 of the light guide. It will be appreciated that as internally reflected light reaches this diffusing region 450, it is then diffused, with a proportion exiting the front surface 401 of the light guide 400 opposite this region 450, such that that the pattern or finish formed in the diffusing region 450 corresponds to the pattern of desired light output of the assembly 1.

In the embodiment shown, it can be seen that the diffusing region 450 is in the form of the logo. Within the scope of the present invention alternatively shaped diffusing regions may also be employed to achieve alternately shaped light outputs.

Irrespective of the desired light output pattern, it will be appreciated that the LEDs 210, 220, 230, 240 cannot be positioned equidistant to all portions of the diffusing region 450, and that achieving uniform light output from such a limited number of LEDs would be difficult to achieve due to regions closer to the LEDs receiving more light and appearing brighter than regions further from the LEDs receiving less light and appearing darker.

While increasing the number of LEDs and using a highly diffuse light guide may go some way to resolve this, it will be appreciated that this solution may undesirably increase the energy consumption of the lighting assembly and decrease the optical efficiency of the light guide and the electrical efficiency of the solution as a whole.

In order to improve uniformity of light output, various measures have been undertaken, as described below.

Figure 8:
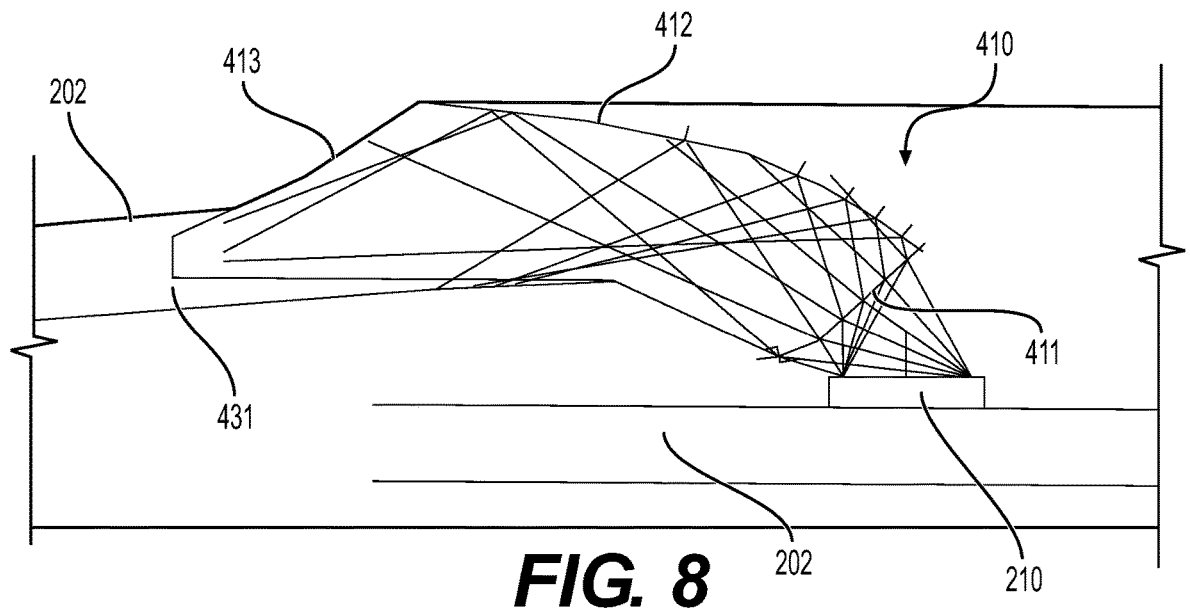
FIG. 8 is a detailed cross-sectional view of a portion of a light entry region of the vehicle design element of FIG. 1, detailing how light rays interact with the light entry region.

The light entry region of the light guide adjacent to each LED features various optical features in order to maximise total internal reflection. With reference to FIG. 8, it can be seen that light emitted by the LED may penetrate the light guide through a light entry surface 411, where it is then transmitted by internal reflection between the light entry surface 411, and the front and rear surfaces 401, 402 of the light guide 400.

The light entry surface 411 of each light entry region is shaped to deflect/refract the majority of light rays toward a conical surface 412 configured to reflect the light rays toward the rear surface 402 of the light guide 400, where they will continue to be reflected by internal reflection along the light guide 400 between the front and rear surfaces 401, 402.

Figure 4:
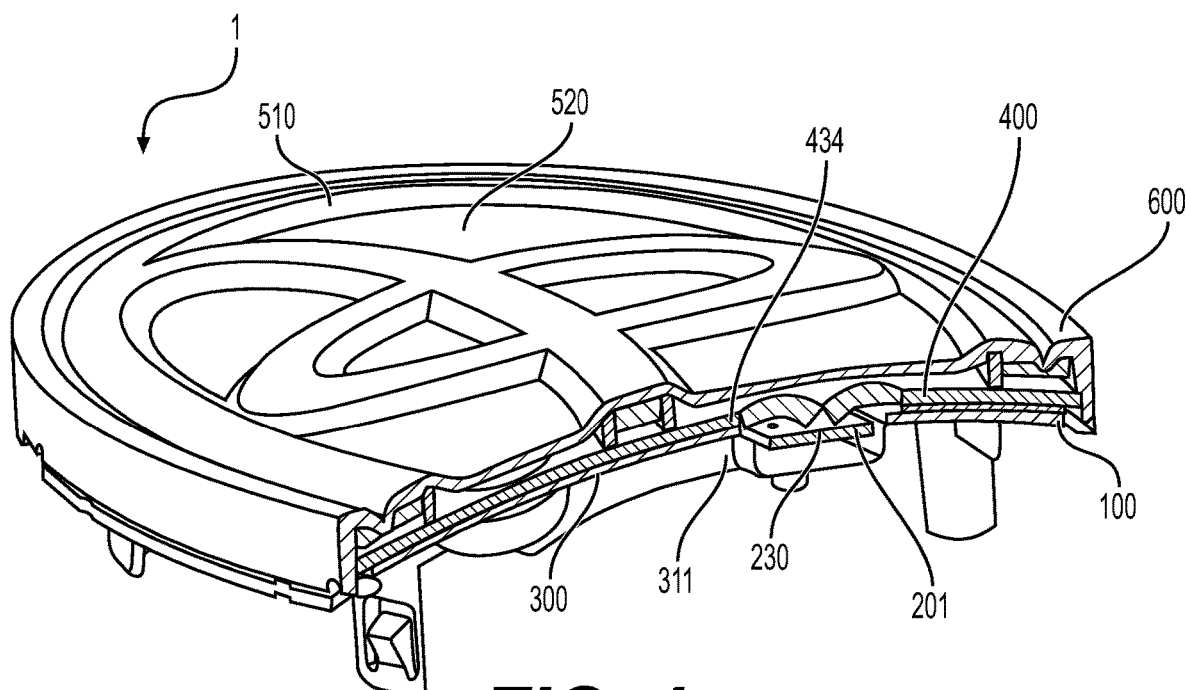
FIG. 4 is a cross-sectional view of the vehicle design element of FIG. 1, taken through the centre of one of the light entry regions of the light guide.

As best shown in FIGS. 4 and 8, each light entry region features a step down surface 413 contiguous with the conical surface 412 and the front surface 401, at a position, where, by virtue of the configuration of the light entry surface 411 and the conical surface 412, a negligible amount of light rays are directed. It will be appreciated that this step down surface 413 allows the thickness of the remainder of the light guide 400 away from the light entry region 410 to be reduced in order to improve transmission of light to the extremities of the light guide 400.

By providing geometry that maximises the amount of achievable total internal reflection, the efficiency of the light guide is able to be increased, such that a reduced number of LEDs is required. While in the embodiment shown, each light entry region features a conical surface formed in the front surface of the light guide, it will be appreciated that other shapes may also be used to direct light from the LED to the remainder of the light guide.

Figure 5:
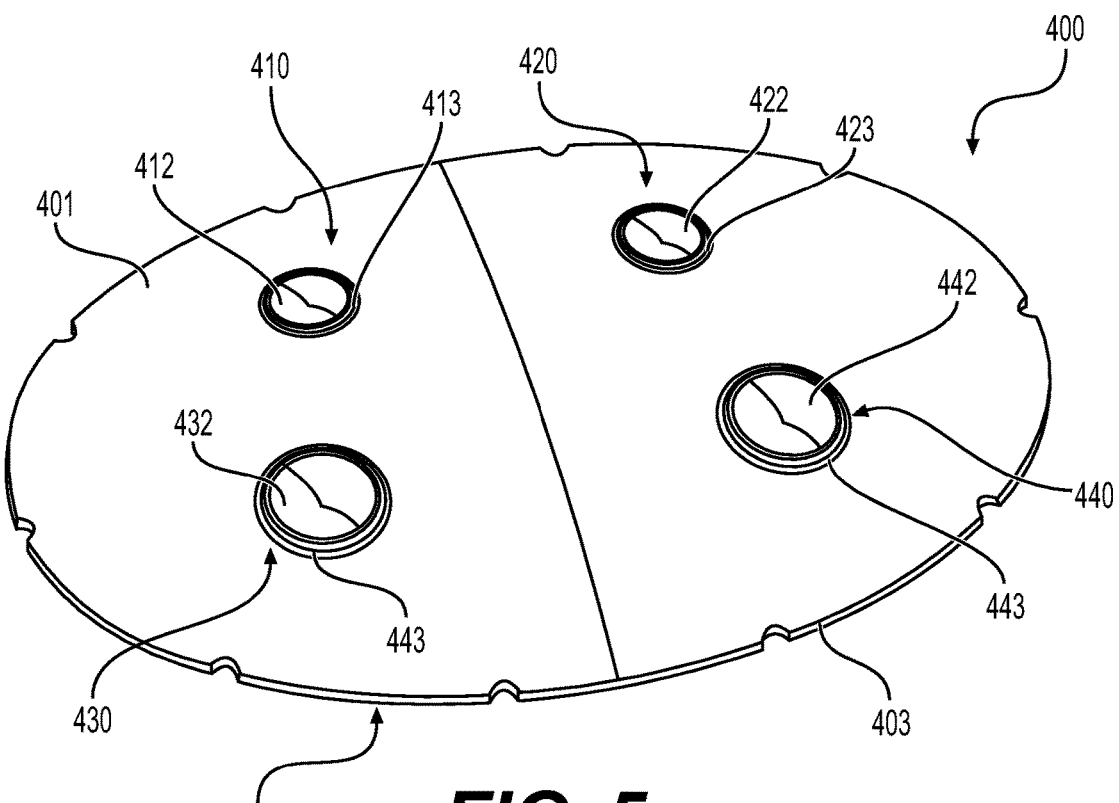
FIG. 5 is a front perspective view of the light guide from the vehicle design element of FIG. 1.
Figure 6:
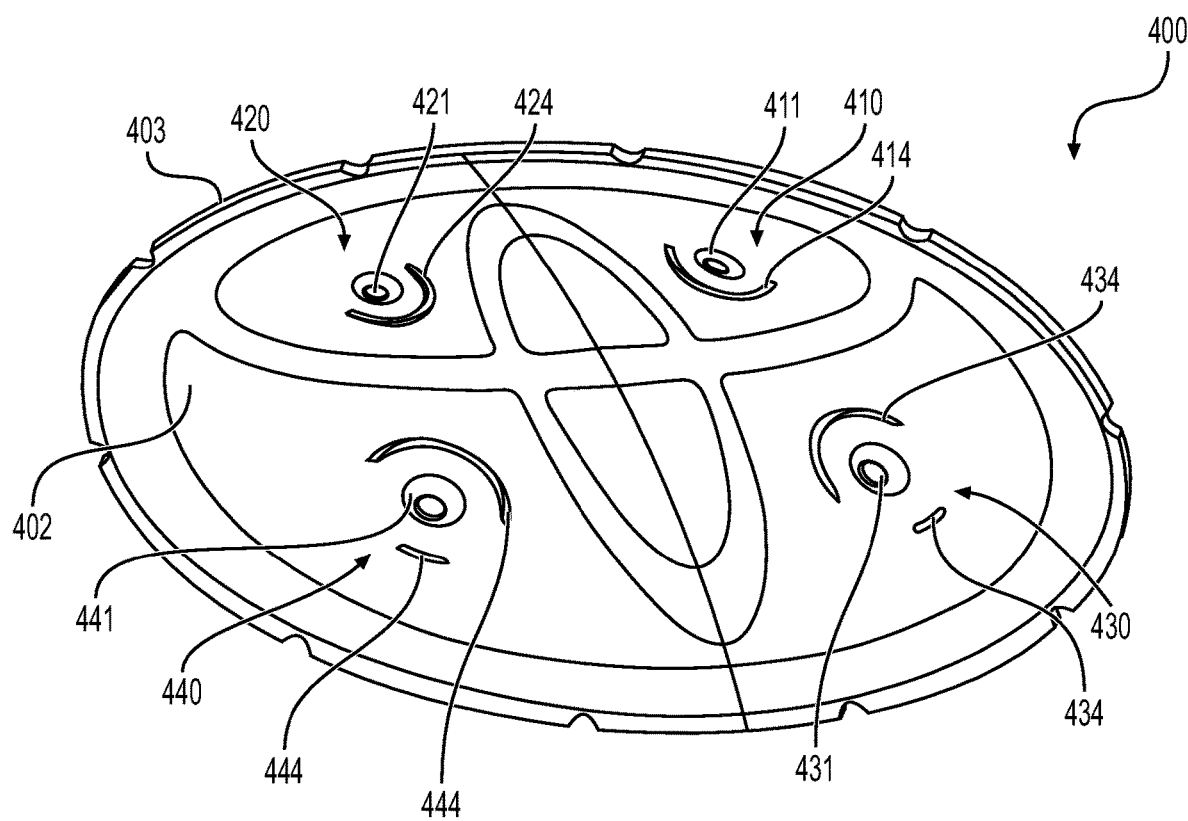
FIG. 6 is a rear perspective view of the light guide of FIG. 5.

With reference to FIGS. 5 and 6 it can be seen that the light entry region geometry may be sized to vary the amount of light received and transmitted through the light guide, such that a smaller light entry surface and conical surface are less efficient than those having larger geometry. In the example shown, the two upper LEDs 210, 220 and their corresponding light entry region geometries 410, 420 are located in closer proximity to the diffusing region 450 than the two lower LEDs 230, 240 and their corresponding light entry regions 430, 440. It will therefore be appreciated that as a result of their relative proximities that larger light entry regions having a higher efficiency are required for the two lower LEDs 430, 440.

Figure 7:
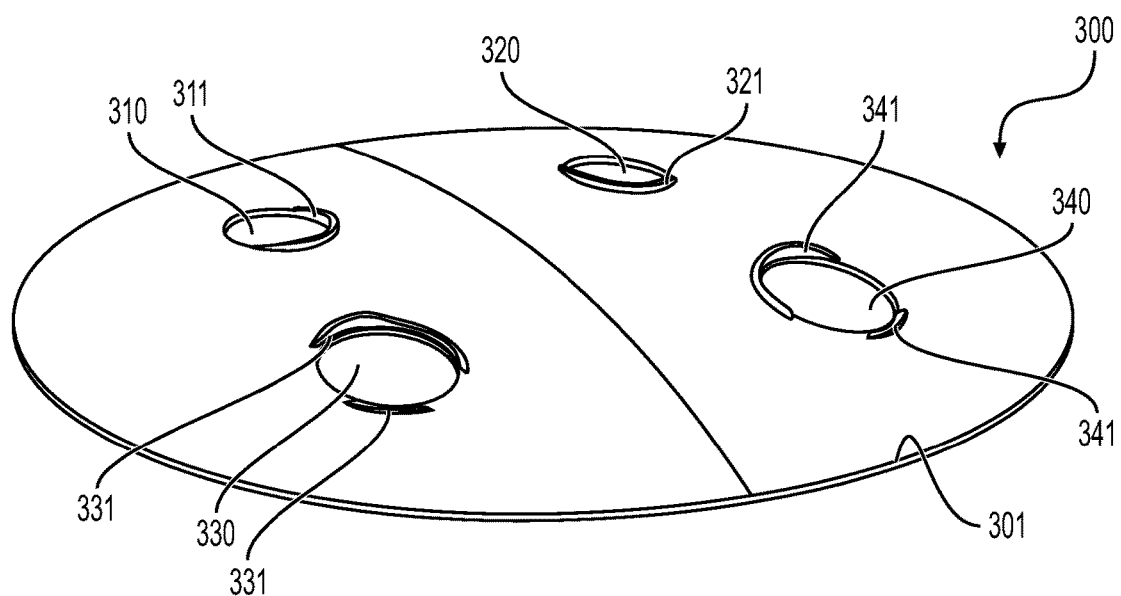
FIG. 7 is a front perspective view of the reflector from the vehicle design element of FIG. 1.

The reflector 300 and light guide 400 also feature complimentary ribs 311, 321, 331, 341 and channels 414, 424, 434, 444 for controlling light distribution near the light entry regions 410. As best shown in FIG. 7, the ribs 311, 321, 331, 341 are formed around the apertures 310, 320, 330, 340 in the reflector 300, where they extend out from the front surface 301 of the reflector 300 and are configured to nest in complimentary channels 414, 424, 434, 444 formed in the rear surface 402 of the light guide 400 so as to interrupt the passage of light rays that have entered the light guide 400. As best shown in FIG. 8 where a cross-sectional view of a portion of a light entry region 410 is shown, it can be seen that the position of the channels and ribs 414, 311 correspond to the parts of the light guide 400 where the step down surface 413 has narrowed the cross sectional area of the light guide 400, so as to effectively intercept light before it passes into regions of the light guide 400 that require less illumination than others. It will be appreciated that regions that require less illumination than others will be driven by the need to reduce hotspots and to produce a relatively homogenous light output from the assembly 1, and will be dependent upon the position of the LEDs and the pattern of the diffusing region, where regions in close proximity to a single LED and/or regions central to multiple LEDs will require reduced illumination.

It will be appreciated that the height of these channels and ribs and the extent to which they surround the light entry regions may be varied in order to fine tune the amount of light interruption achieved.

As best shown in FIGS. 5 to 7, it can be seen that each of the light entry regions feature a rib and channel that extend approximately 180 degrees around the light entry region so as to interrupt a proportion of light entering and travelling toward a central portion of the diffusing region 450 which is central to each of the light entry regions. It can also be seen that the each of the lower two light entry regions feature a second rib and channel that extend approximately 45 degrees around the light entry region so as to interrupt a proportion of light travelling toward a portion of the diffusing region in close proximity to each light entry region.

It will also be appreciated the use of these complimentary ribs and channels assists in locating the light guide and reflector with respect to one another during assembly.

Figure 9:
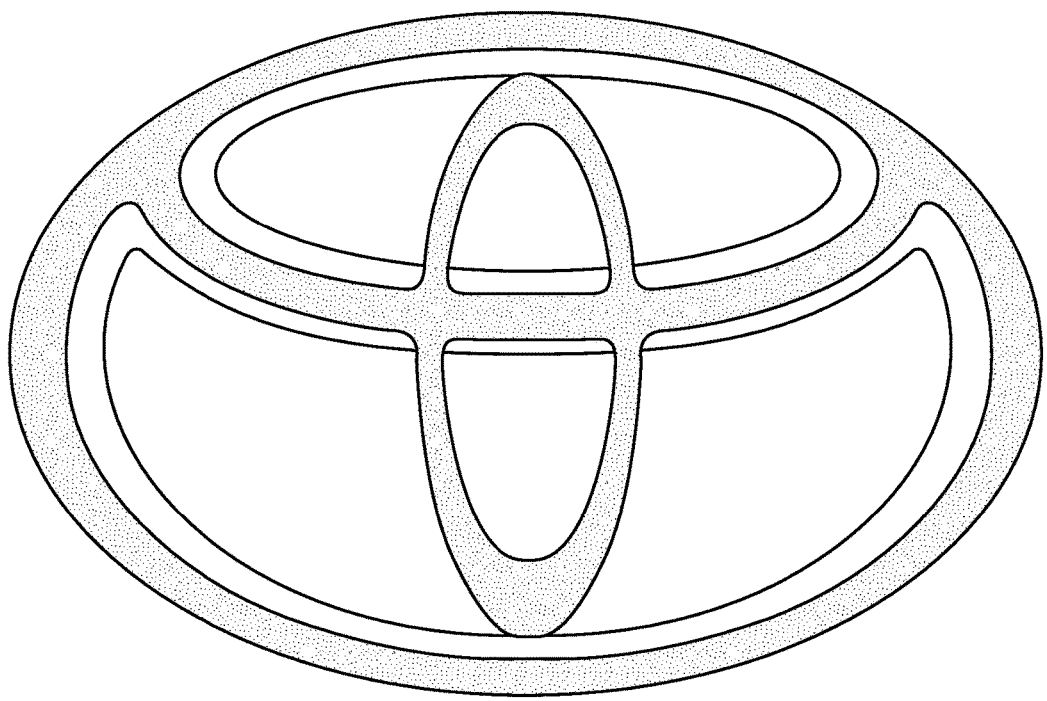
FIG. 9 is simulation output for a vehicle design element with ribs and channels, revealing light intensity across the light emitting surface of the assembly.
Figure 10:
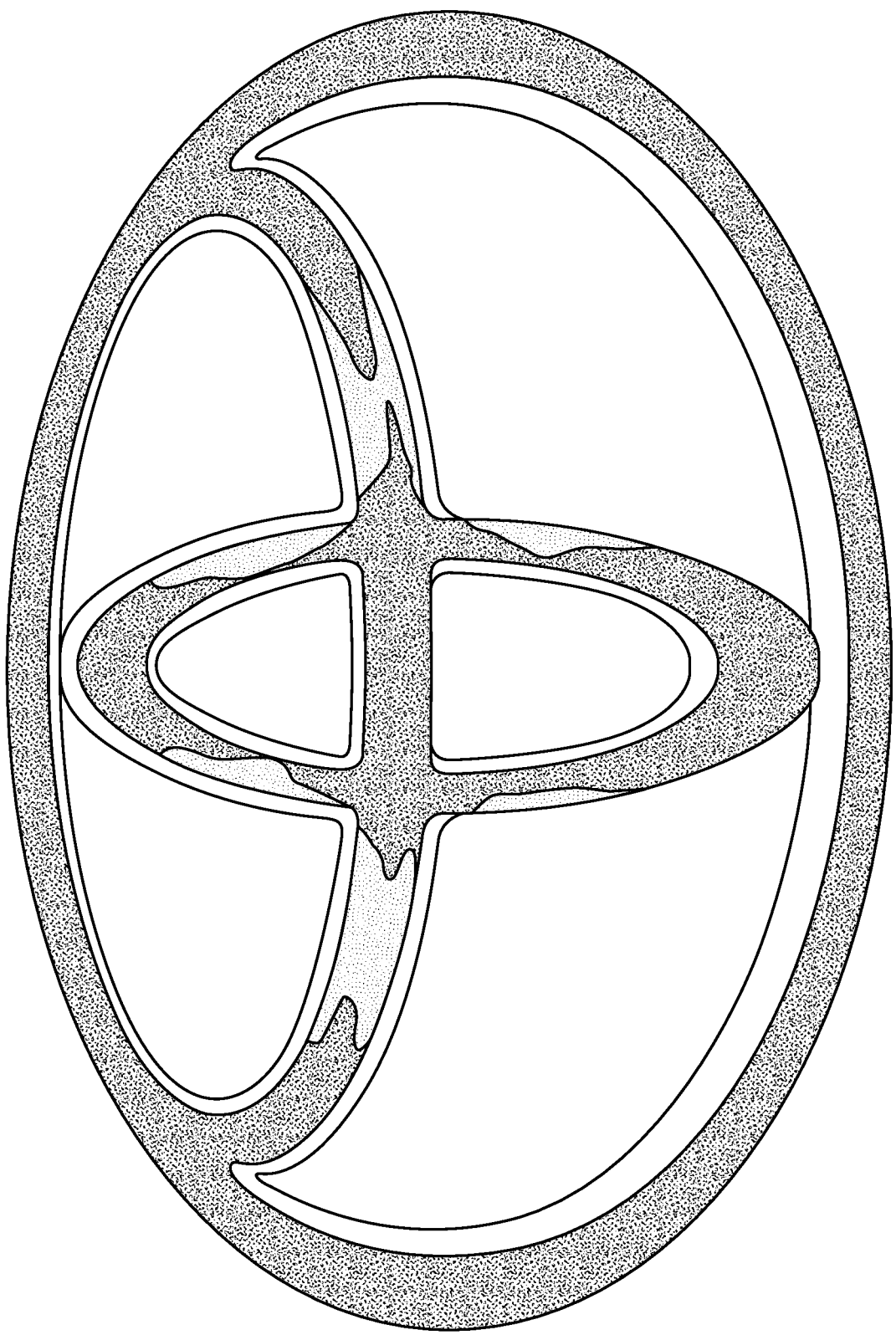
FIG. 10 is simulation output for a vehicle design element without ribs and channels revealing light intensity across the light emitting surface of the assembly.

Referring now to FIGS. 9 and 10 where output from a simulation is provided, showing the difference in light distribution between a light guide with ribs and channels (FIG. 9 and a light guide without ribs and channels (FIG. 10). It can be seen that in the present invention the version of the light guide with ribs and channels produces a significantly more even light distribution across the light transmissive region than the version without, which features hotspots in regions that were of close proximity to and/or central to the light entry regions.

While the majority of light transmitted from the LEDs is intended to be internally reflected by the light guide 400, it will be appreciated that some of the light will exit the light guide 400 through the front and rear surfaces 401, 402. The reflector 300 may have a finish (such as a white matte or etched mirror finish) on its front surface 301 capable of reflecting and diffusing stray light rays back toward the light guide 400. It will also be appreciated that this same matte white or etched mirror finish may also be applied to the ribs of the reflector 300, such that when the ribs interrupt the passage of light travelling through the light guide 400, they reflect and diffuse light back through the light guide 400. In a preferred form, the reflector 300 is manufactured from white nylon. It will of course be appreciated that in an alternative embodiment, other suitable materials may be employed.

The perimeter or edge 403 of the light guide may 400 also be treated with a reflective surface, for instance, having a white finish, such that any light rays reaching the edge 403 of the light guide 400 are reflected back through the light guide 400, rather than being absorbed by the rear and front housings 100, 600.

In front of the light guide 400 is a lens assembly 500 comprising a light transmissive region 510 and an opaque region 520, where the light transmissive region 510 is provided adjacent to the diffusing region 450 of the light guide 400, such that the light exiting the front surface 401 of the light guide 400 opposite the diffusing region 450, is transmitted through the lens assembly 500.

In the embodiment shown, the light transmissive region 510 and the opaque region 520 are formed from separate components, being a light transmissive lens 510 and opaque inserts 520. The rear surface 521 of the opaque inserts 520 may also be treated with a reflective surface, for instance, having a white finish, such that any stray light rays are reflected back through the light guide 400, rather than being absorbed by the inserts 520. In another form, the rear surface 521 may feature an additional component having reflective properties which may be co-molded, joined or clipped in to provide reflectivity and/or diffusion.

The lens 510 is made with at least partially transparent or semi-transparent, translucent material, such as polycarbonate. It is also capable of including one or more opaque portions. A mask (not shown) for delimiting light emission portions of the lens may also be applied. In a preferred form, the opaque inserts 520 are manufactured from a black PMMA. It will of course be appreciated that in an alternative embodiment, other suitable materials may be employed.

In one form, the lens may comprise an outer component and an inner component. The outer component may be manufactured from a clear material and the inner component may be overmolded on to the inner surface of the outer component, using an opaque material.

Referring now to FIGS. 11 to 14, where there are shown representations of an alternative light guide and reflector arrangement. Similar to the previous embodiment, the reflector 700 features four apertures 710, 720, 730, 740 positioned and sized such that light emitted from each of the LEDs passes through the apertures and toward the light guide 800. Unlike the previous embodiment, it can be seen that the apertures are smaller, and features a tapered surface 712, 722, 732, 742 to encourage further internal reflection within the overall assembly.

Similar to the previous embodiment, the light guide 800 also features four light entry regions 810, 820, 830, 840 configured to maximise the amount of light internally reflected in to the light guide 800. The reflector 700 and light guide 800 also feature complimentary ribs 711, 721, 731, 741 and channels 814, 824, 834, 844 for controlling light distribution near the light entry regions.

Figure 11:
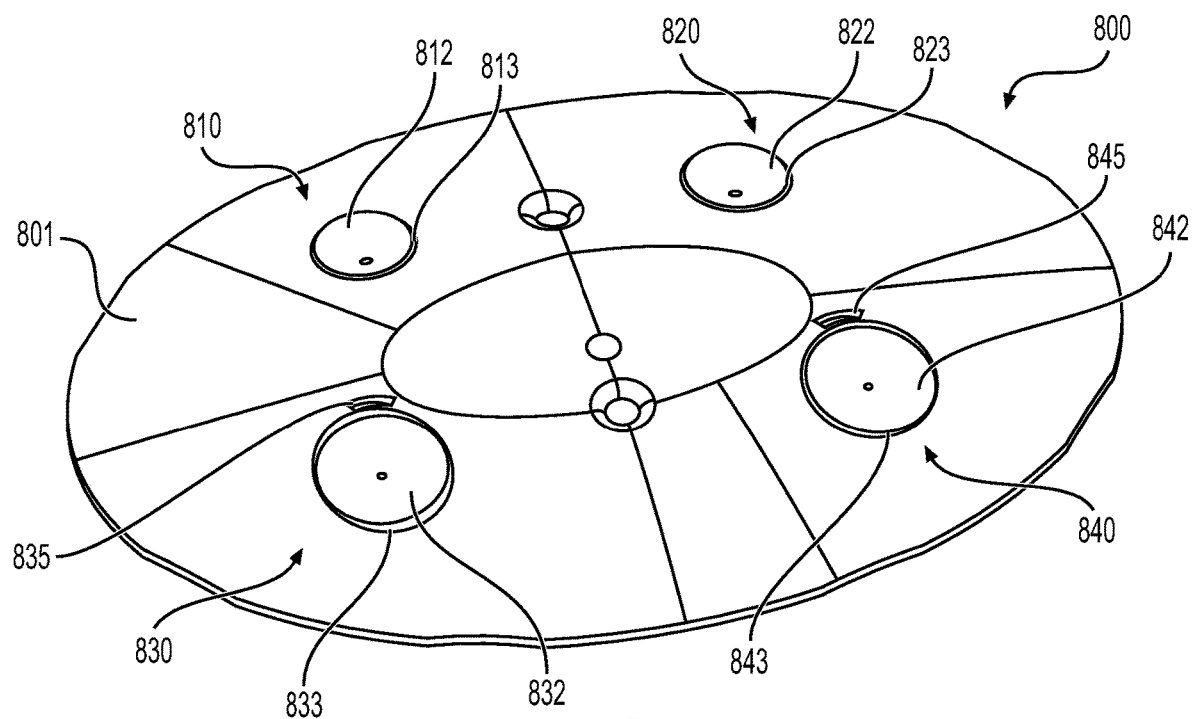
FIG. 11 is a front perspective view of a light guide, according to an alternate embodiment.
Figure 12:
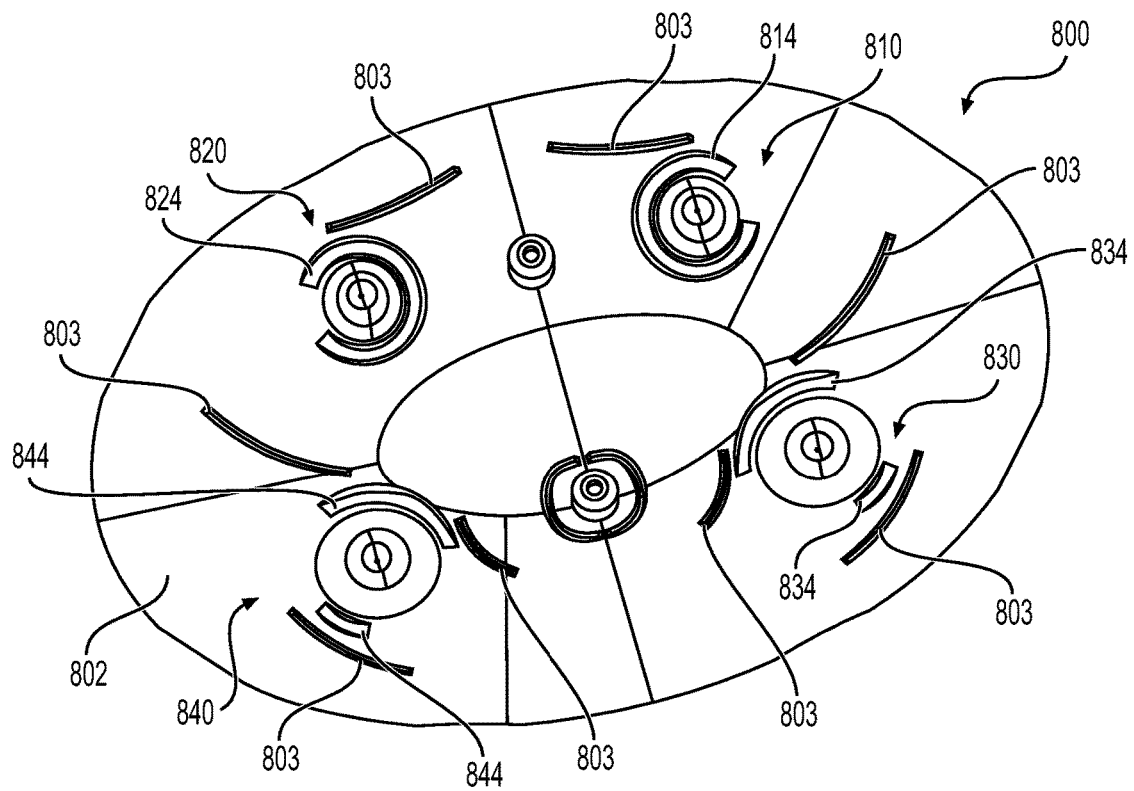
FIG. 12 is a rear perspective view of the light guide of FIG. 11.
Figure 14:
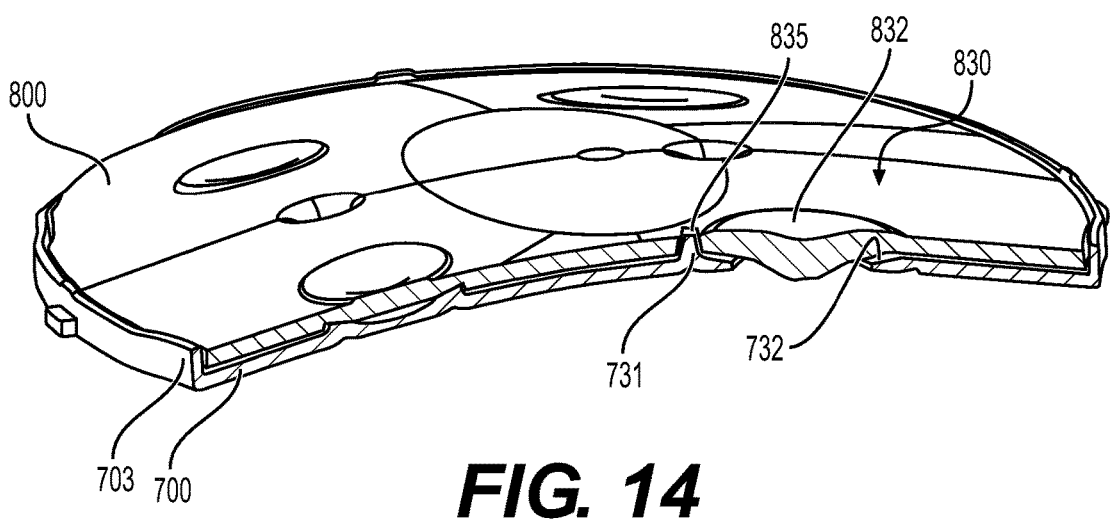
FIG. 14 is a cross-sectional view, detailing the inter-engagement of the light guide of FIG. 11 and the reflector of FIG. 13.

With reference to FIGS. 11, 12 and 14, it can be seen that a portion of two of the channels 834, 844 comprise through holes 835, 845 in order to accommodate portions of the corresponding ribs 731, 741, which extend through the entirety of the light guide 800, so as to completely interrupt the passage of light through the light guide 800.

Unlike the previous embodiment, it can also be seen that the reflector 700 and light guide 800 feature additional complimentary ribs 702 and channels 803 located at regions between the light entry regions and the light emitting surface, for the purpose of further controlling the distribution of light throughout the light guide 800.

Figure 13:
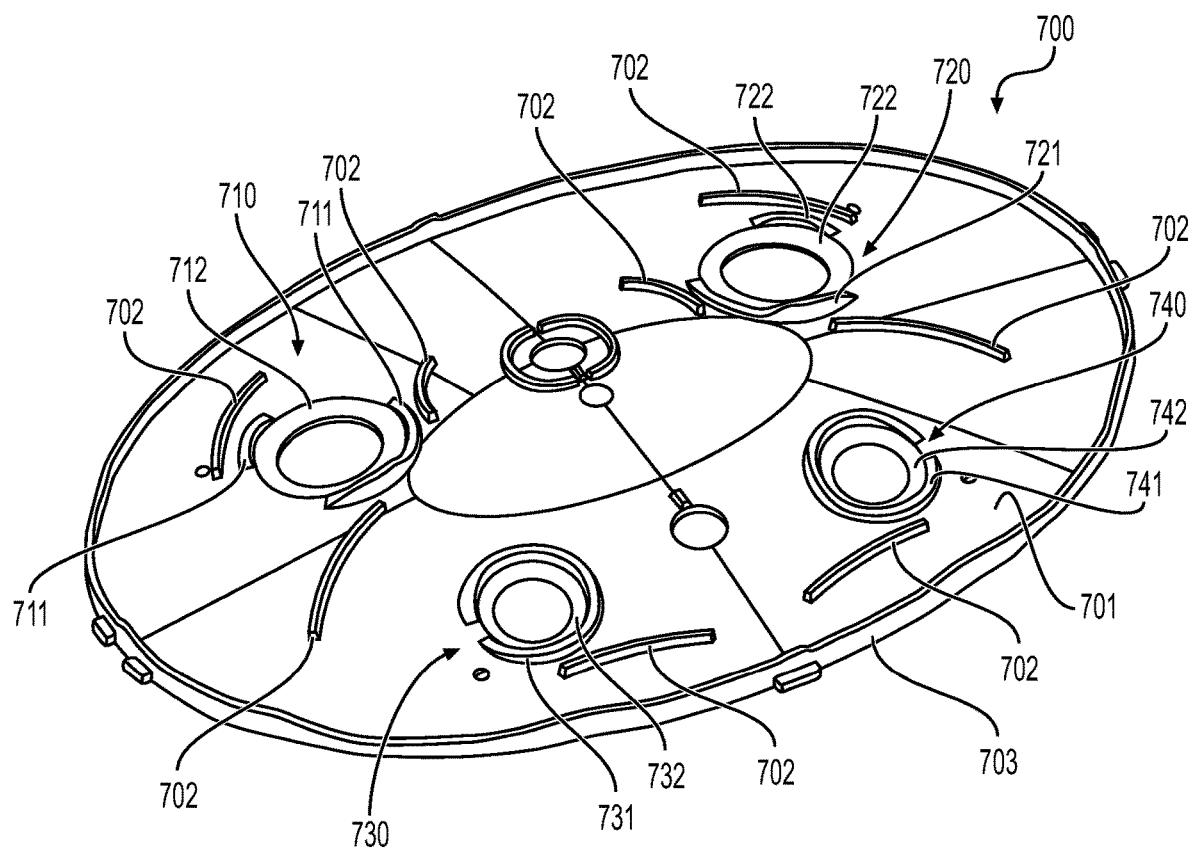
FIG. 13 is a front perspective view of a reflector, according to an alternate embodiment.

Referring now to FIGS. 13 and 14, where it can also be seen that the reflector 700 is provided with a rim 703 extending from the front surface 701 around the perimeter of the light guide 700. It will be appreciated that, along with the front surface 701 this rim 703 will also have a finish (such as a matte white or etched mirror finish) capable of reflecting and diffusing stray light rays reaching the edge 803 of the light guide 800 back through the light guide 800. As can also be seen in FIG. 13, the height of the rim 703 may vary in order to fine tune the amount of light reflected back toward the light guide 800.

While in the embodiment shown, the vehicle design element is in the form of a well-known automotive brand, it will be appreciated that alternative designs are also intended to fall within the scope of this disclosure, and that similar principles for positioning LEDs, sizing their corresponding light entry region geometry and positioning and sizing of associated ribs and channels will result in a desirable homogenous light output.

In one embodiment the lens 510 may comprise a continuous transparent and/or translucent coating on an outer surface facing the external environment to provide a hidden to lit functionality (HTL). In one further embodiment, the transparent and/or translucent coating can be provided on an inner surface of the lens 510 or the transparent and/or translucent coating cyan be provided on both sides of the lens 510. The transparent and/or translucent coating is at least partially permeable to at least some of the diffuse light which is passed through the lens 510. The transparent and/or translucent coating may be a transparent and/or translucent thin metal layer formed from a metal, alloy, or metalloid selected from the group consisting of chromium, aluminium, titanium, nickel, molybdenum, zirconium, tungsten, silicon, niobium, tantalum, vanadium, cobalt, manganese, silver, zinc, indium, germanium, tin, boron, arsenic, antimony, tellurium and mixtures thereof and/or an oxide, nitride, boride, fluoride or carbide thereof, and mixtures thereof. The transparent and/or translucent transmits the homogenous light output. In one embodiment, the transparent and/or translucent coating is a chromium or chromium-based reflective coating, and both the lens 510, the chromium or chromium-based reflective coating are at least partially transmissive to light originating from the light guide. In another embodiment, a paint and/or opaque material may be coated onto the lens 510 to form the mask layer.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

REFERENCE SIGNS

1—vehicle design element
100—rear housing
110—fastening means

102—recessed portion
200, 201, 202, 203—printed circuit board (PCBA)
204—fastener
210, 220, 230, 240—LED
300—reflector
301—front surface
310, 320, 330, 340—aperture
311, 321, 331, 341—ribs
400—light guide
401—front surface
402—rear surface
410, 420, 430, 440—light entry region
411, 421, 431, 441—light entry surface
412—concial surface
413—step down surface
414, 424, 434, 444—channels
450—diffusing region
500—lens assembly
510—light transmissive region
520—opaque region
521—rear surface
600—front housing
700—reflector
701—front surface
702—ribs
703—rim
710, 720, 730, 740—apertures
711, 721, 732, 741—ribs
712, 722, 732, 742—tapered surface
731, 741—ribs
800—light guide
803—channel
810, 820, 830, 840—light entry region
814, 824, 834, 844—channel
835, 845—through hole

The invention claimed is:

1. A vehicle design element including a light assembly, the assembly comprising:
   a light guide including a front surface, a rear surface, a plurality of light entry regions and a light diffusing region;
   a plurality of light emitting diodes (LEDs), each LED positioned adjacent to and directed towards a respective light entry region, wherein light from each LED enters the light guide via its respective light entry region and is directed toward the light diffusing region of the light guide via internal reflection;
   a reflector element positioned behind the light guide adjacent to the rear surface of the light guide, the reflector element including a plurality of apertures corresponding to each LED and light entry region, the reflector element further including a front surface configured to reflect light toward the light guide;
   wherein the reflector element and light guide further comprise complimentary ribs and channels for controlling light distribution near the light entry regions, where the ribs are formed around the apertures in the reflector element, extending out from the front surface of the reflector, where they are configured to nest in complimentary channels formed in the rear surface of the light guide so as to interrupt the passage of light rays that have entered the light guide via the light entry regions.

2. The vehicle design element of claim 1, wherein each light entry region includes a light entry surface formed in the rear surface of the light guide, through which light emitted by its corresponding LED may penetrate the light guide, where it is then transmitted by internal reflection.

3. The vehicle design element of claim 2, wherein each light entry region further includes a conical surface formed in the front surface of the light guide, wherein the light entry surface is shaped to deflect/refract a majority of light rays toward the conical surface, wherein the conical surface is configured to reflect the light rays toward the rear surface of the light guide, where the light rays continue to be reflected by internal reflection along the light guide between the front and rear surfaces.

4. The vehicle design element of claim 3, wherein each light entry region further includes a step down surface contiguous with the conical surface and the front surface of the light guide, at a position where, by virtue of the configuration of the light entry surface and the conical surface, a negligible amount of light rays are directed, the step down surface allowing the thickness of the remainder of the light guide away from each light entry region to be reduced.

5. The vehicle design element of claim 1, wherein the complimentary ribs and channels extend around a portion of each light entry region.

6. The vehicle design element of claim 1, further comprising a lens assembly positioned in front of the light guide, the lens assembly comprising a light transmissive region and an opaque region, the light transmissive region provided adjacent to the diffusing region of the light guide, such that light exiting the front surface of the light guide opposite the diffusing region is transmitted through the lens assembly.

7. The vehicle design element of claim 6, further comprising a rear housing and a front housing, that work in conjunction with the lens assembly to house the LEDs, reflector and light guide together in a weatherproof environment.

8. The vehicle design element of claim 6, wherein the lens further comprises a continuous transparent and/or translucent coating on an outer surface facing the external environment.

9. The vehicle design element of claim 8, wherein the continuous transparent and/or translucent coating comprises a transparent and/or translucent thin metal layer formed from a metal, alloy, or metalloid selected from the group consisting of chromium, aluminium, titanium, nickel, molybdenum, zirconium, tungsten, silicon, niobium, tantalum, vanadium, cobalt, manganese, silver, zinc, indium, germanium, tin, boron, arsenic, antimony, tellurium and mixtures thereof and/or an oxide, nitride, boride, fluoride or carbide thereof, and mixtures thereof.

10. The vehicle design element of claim 8, wherein the continuous transparent and/or translucent coating is a chromium or chromium-based reflective coating-, and both the lens, the chromium or chromium-based reflective coating are at least partially transmissive to light originating from the light guide.

11. The vehicle design element of claim 6, wherein a paint and/or opaque material is coated onto the lens to form a mask layer.

* * * * *